United States Patent
Mariani et al.

(10) Patent No.: US 10,373,376 B2
(45) Date of Patent: Aug. 6, 2019

(54) METHOD FOR MAKING A CONTENT SENSITIVE VIDEO

(75) Inventors: Roberto Mariani, Singapore (SG); Richard Claude Georges Leon Roussel, Bangkok (TH)

(73) Assignee: SKYDOOR PTE LTD (SG)

(*) Notice: Subject to any disclaimer, the term of this patent is extended or adjusted under 35 U.S.C. 154(b) by 335 days.

(21) Appl. No.: 14/395,591

(22) PCT Filed: Apr. 20, 2012

(86) PCT No.: PCT/SG2012/000141
§ 371 (c)(1),
(2), (4) Date: Dec. 3, 2014

(87) PCT Pub. No.: WO2013/158034
PCT Pub. Date: Oct. 24, 2013

(65) Prior Publication Data
US 2015/0086181 A1    Mar. 26, 2015

(51) Int. Cl.
*G06T 19/00* (2011.01)
*G11B 27/02* (2006.01)
*G11B 27/10* (2006.01)

(52) U.S. Cl.
CPC ............ *G06T 19/003* (2013.01); *G11B 27/02* (2013.01); *G11B 27/10* (2013.01)

(58) Field of Classification Search
None
See application file for complete search history.

(56) References Cited

U.S. PATENT DOCUMENTS

| | | | |
|---|---|---|---|
| 2003/0063133 A1* | 4/2003 | Foote | G06F 3/04815 715/850 |
| 2012/0188452 A1* | 7/2012 | Keiser | G06T 13/00 348/559 |
| 2012/0299920 A1* | 11/2012 | Coombe | G06T 19/00 345/423 |

OTHER PUBLICATIONS

Study on the Flight Path of Ping-Pang Based on the Technology by Xiaolg Wang. Romanian reviewer precision mechanic, optical and mecatronics. 2016, issue 49, p. 112-116.*
Snavely et al., "Modeling the World from Internet Photo Collections", International Journal of Computer Vision, vol. 80, Issue 2, Nov. 2008, 22 pages.
Christie et al., "Camera Control in Computer Graphics", Computer Graphics forum, vol. 27, Issue 8, pp. 2197-2218, Dec. 2008, 22 pages.
The International Search Report and the Written Opinion issued for International application No. PCT/SG2012/000141 dated Jun. 26, 2012, 14 pages.

* cited by examiner

*Primary Examiner* — William C Vaughn, Jr.
*Assistant Examiner* — Daniel Tekle
(74) *Attorney, Agent, or Firm* — Prince Lobel Tye LLP

(57) ABSTRACT

A method is described for recording a video. The method comprises receiving one or more user content and then providing a 3D virtual world and a virtual camera having one or more parameters. The optimal 3D flight path of the virtual camera is then determined based on the user content and the virtual camera is then allowed to travel along the optimal 3D flight path and to record the video.

11 Claims, 4 Drawing Sheets

METHOD FOR MAKING A CONTENT SENSITIVE VIDEO

CROSS REFERENCE TO RELATED APPLICATION(S)

This application is a 35 U.S.C. § 371 National Phase Entry Application from PCT/SG2012/000141, filed Apr. 20, 2012, designating the United States. The entire disclosure of the referenced application is incorporated herein in its entirety by reference.

FIELD OF THE INVENTION

The present invention relates to a method for making a content sensitive video.

BACKGROUND

Software products have been developed for the instant insertion of multimedia content into 3D virtual worlds and for a video recording that produces instantaneously videos, ready for global broadcasting. The video recording is achieved by passing through the 3D virtual world using a virtual camera that is controlled manually. Presently, there are no alternatives for making this form of video recording aside from manual methods.

Existing software products allow a user to:
Browse a catalogue of images/videos/audio;
Use the image/video editor to apply image/video processing tools;
Use the video composer to create videos with special effects, transitions, and trimming;
Send the video to the 3D world, manually define flight path, add localized sounds and navigate through the 3D world and record the navigation.

Disadvantages arise in that present conventional methods of making a video recording is not automatic and that the manually defined flight path may not be suitable for, and not catered to the multimedia content provided by the user. Further, manual designation of the flight path is tedious and subject to error.

Therefore, the object of the invention is to provide a solution that overcomes the above disadvantages or at least provides a novel method for making a video.

SUMMARY OF INVENTION

According to an embodiment, a method is described for recording a video. The method comprises receiving one or more user content and providing a 3D virtual world and a virtual camera having one or more parameters. The optimal 3D flight path of the virtual camera is then determined based on the one or more user content. The virtual camera is then allowed to travel along the optimal 3D flight path and to record the video.

In another embodiment, the method further comprises the step of modifying the one or more parameters of the virtual camera based on the one or more user content.

In another embodiment, the step of determining the optimal 3D flight path comprises providing a plurality of 3D flight paths and extracting a plurality of attributes from the one or more user content. Each of the plurality of 3D flight paths are then optimized based on the plurality of attributes. An aesthetic function is then used to calculate an aesthetic quality of each of the optimized 3D flight paths. The optimized 3D flight path with the highest aesthetic quality is the selected as the optimal 3D flight path.

In another embodiment, the one or more user content comprises one or more multimedia content and the step of optimizing each of the plurality of 3D flight paths comprises selecting one or more segments on the 3D flight path and optimizing the one or more segments based on the plurality of attributes. The 3D flight path is then deformed based on the one or more optimized segments.

In another embodiment, the step of optimizing the one or more segments comprises deriving a plurality of recommended deformations for the one or more segments based on the plurality of attributes. The recommended deformation is then selected using dynamic programming and the one or more segments are then deformed based on the selected recommended deformation.

In another embodiment, the one or more user content comprises an audio track.

In another embodiment, a method is described for creating a new flight path. The method comprises providing a first flight path and a second flight path and concatenating the first flight path to the second flight path to create a new flight path.

In another embodiment, a method is described for creating a new flight path. The method comprises providing a first flight path and a second flight path, extracting a subpath from the first flight path and concatenating the subpath to the second flight path to create a new flight path.

In another embodiment, a computer program is described for instructing a computer to perform any of the methods as described herein.

In another embodiment, a computer readable medium is described having the computer program as described herein.

The invention will now be described in detail with reference to the accompanying drawings.

BRIEF DESCRIPTION OF THE DRAWINGS

In order that embodiments of the invention may be fully and more clearly understood by way of non-limitative examples, the following description is taken in conjunction with the accompanying drawings in which like reference numerals designate similar or corresponding elements, regions and portions, and in which.

DETAILED DESCRIPTION

Figure 1:
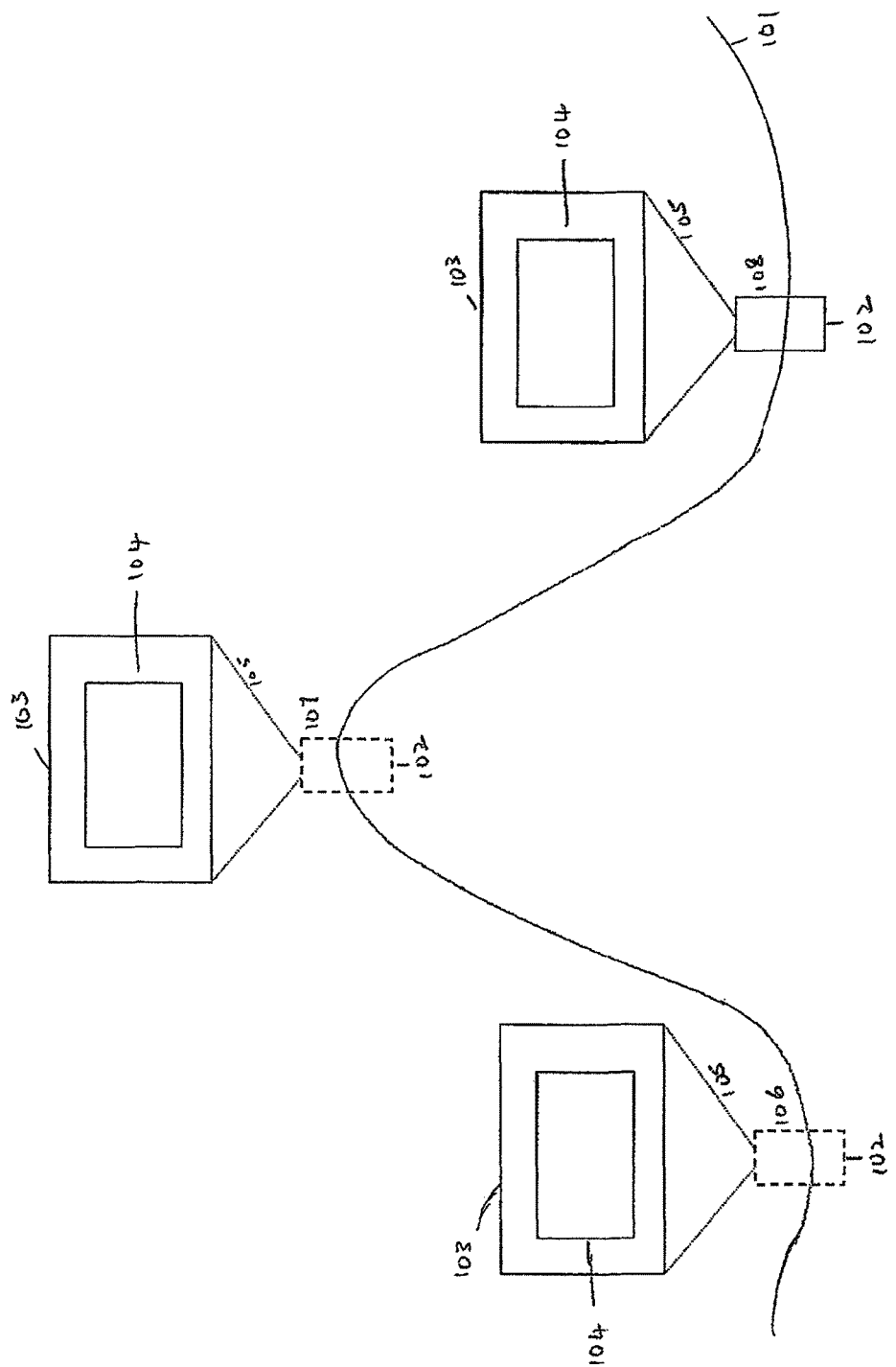
FIG. 1 is a diagram illustrating a virtual camera on a flight path in a 3D virtual world.

Referring to the drawings, FIG. 1 shows a flight path 101 of a virtual camera 102 in a 3D virtual world. A particular 3D virtual world can have a plurality of flight paths 101 tailored or associated to it. Virtual camera 102 has a field of view 105. This field of view 105 is what the virtual camera 102 "sees" and is what the virtual camera 102 records at any one-time. In the 3D virtual world, there are 3D objects, and the surface on a 3D object where multimedia content 104 (which includes images and videos) is displayed is called a screen 103.

When moving along the flight path 101, one or more screens 103 may enter the virtual camera's 102 field of view 105. The screens 103 that come into the virtual camera's 102 field of view 105 in a flight path 101 is henceforth referred to as the screens 103 along the flight path 101. As the virtual camera 102 travels along flight path 101 and when the screens 103 come into the virtual camera's 102 field of view 105, the virtual camera 102 will record the multimedia content 104 which are displayed on the screens 103. Virtual camera positions 106, 107 and 108 are the positions along the flight path 101 where the virtual camera 102 will be momentarily stationary such that it can record the multimedia content 104 on the screens 103.

Figure 2:
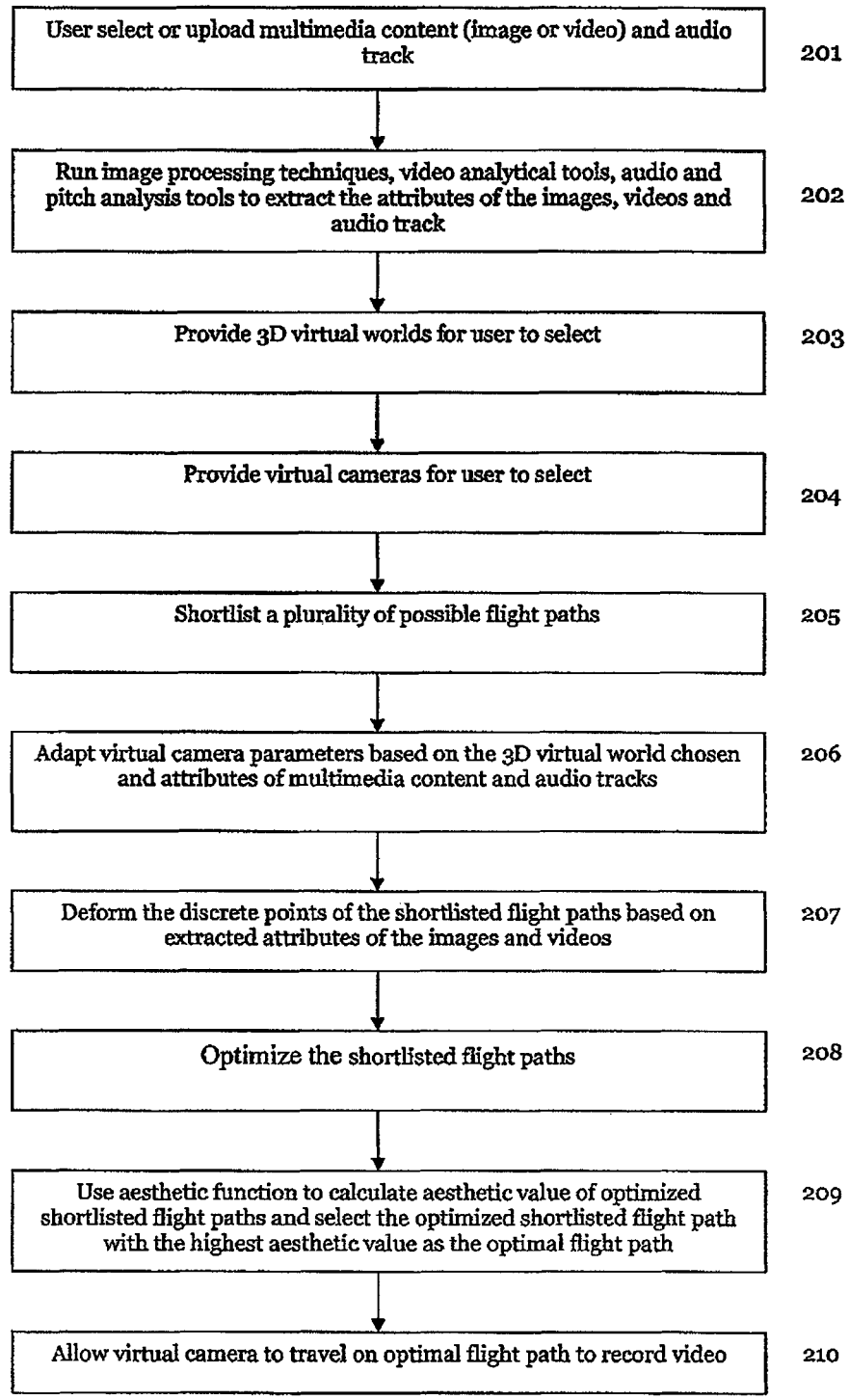
FIG. 2 is a flow chart illustrating a method to record a video.

In accordance with a preferred embodiment of the invention, FIG. 2 shows a method for producing a 2D video. In Step 201, a software program is provided such that a user can use the software program to upload multimedia content (images and videos) and audio tracks. Alternatively, the software program also provides a database of multimedia content and audio tracks for the user to choose from.

In step 202, the software program extracts the attributes of the uploaded or selected multimedia content (images or videos) and audio tracks. For images, the software program runs image processing techniques to extract attributes of the images. Examples of image processing techniques include Face detection, Character Recognition, Geometric shape detection, natural texture labeling. Attributes of the image can be the content of the image for example, the image has "2 faces that is 30×40 pixels wide" and "3 lines of text that is 12 pixels per inch". For videos, the software program uses video analytical tools to break the video down to a series of frames (akin to images) and extract attributes of these frames. Other attributes of the video like the length of video, and video frame rate are also extracted.

The software program uses audio and pitch analysis tools to extract audio signal attributes like pitch and tempo. These audio signal attributes can be used by the software program to trigger special effects in the 3D virtual world. The software program can access an entire database of special effects that corresponds to each audio signal attribute. For example, if the audio track is a Mozart piece with a slow tempo and low pitch, the software program will insert butterflies into the 3D virtual world. If the audio track is a rock track with fast tempo and high pitch the software program will insert fireworks into the 3D virtual world.

In step 203, the software program provides a database of 3D virtual worlds for the user to select from. Examples of 3D virtual worlds can be a New York City virtual world and a football stadium virtual world. A search function can be provided to the user such that a user can enter his search criteria and the software program will return a filtered list of 3D virtual worlds. For example, a user can enter the word "stadium" into the search function, and the software program returns a basketball stadium 3D virtual world, a football stadium 3D virtual world etc. The 3D virtual worlds that are provided by the software program to the user to select from may also be dependent on the multimedia content uploaded/selected by the user. For example, if the multimedia content consists of 3 images, the software program may only shortlist to the user 3D virtual worlds which have 3 screens. Alternatively, the software program may also modify an existing 3D virtual world by adding or deleting screens to tally the number of screens with the number of multimedia content uploaded by the user, and shortlist this modified 3D virtual world to the user.

In step 204, the software program provides a plurality of virtual cameras for the user to select from. The appearance and parameters of the virtual cameras can mimic actual video camera models from Sony, Canon etc. so that users can choose to use virtual cameras that they are accustomed to. The virtual cameras can also have infrared or thermal options such that the filming of the 2-D video is seen to be in the infrared or thermal spectrum.

In step 205, the software program filters or shortlists a plurality of possible flight paths out of a database of flight paths. The shortlisted flight paths can include the flight paths tailored to the selected 3D virtual world. The shortlisted flight paths can also include flight paths that are not tailored to the selected 3D virtual world but tailored to other 3D virtual worlds. The shortlisted flight paths can also contain flight paths (out of the shortlisted flight paths) that have been modified by the software program based on certain criteria. For instance, if the number of screens in a shortlisted flight path exceeds the number of multimedia content uploaded by a user, the shortlisted flight path may be modified such that the virtual camera travels to only the screens that display the multimedia content.

In an instance where the number of screens in a shortlisted flight path is less than the number of multimedia content uploaded by a user, the shortlisted flight path may be modified such that the flight path reroutes back to screens it has already passed such that different multimedia content can be displayed on the same screen across a period of time. To illustrate this with an example, the number of screens in a flight path is two (Screen 1 and 2) and the number of multimedia content uploaded by a user is three (Image 1, 2 and 3). Image 1 and 3 will be displayed on Screen 1 at different points in time and Image 2 will be displayed on Screen 2. The flight path will therefore comprise the virtual camera travelling towards Screen 1 displaying Image 1, and thereafter to Screen 2 displaying Image 2. The flight path will then result in the virtual camera travelling back to Screen 1 displaying Image 3. If the multimedia contents are sequential power point slides, the display order of the multimedia content should be adhered to.

For each flight path, the virtual camera will have a set of default virtual camera parameter values (such as speed, pan and tilt) at different regions of the flight path. In step 206, the virtual camera parameters can be adapted based on the 3D virtual world chosen. The pan and tilt of the virtual camera should be changed such that the screens would come into the field of view of the virtual camera. The speed of the virtual camera should also be changed in light of the positions of the screens. For example, at the regions of the flight path where the screen is partially inside or inside the virtual camera's field of view, the speed of the virtual camera is slowed down and the virtual camera may take a stationary position at the front of the screen.

The time taken in the flight path should adhere to the duration of the selected audio track. Therefore, the speed of the virtual camera as it travels through the flight path can be modified such that the time taken in the flight path adheres to the duration of the selected audio track. The virtual camera parameters are also modified in light of the extracted attributes of the multimedia content. If the extracted attributes of the multimedia content is that it contains images of small text, the zoom of the virtual camera may be increased.

Figure 3:
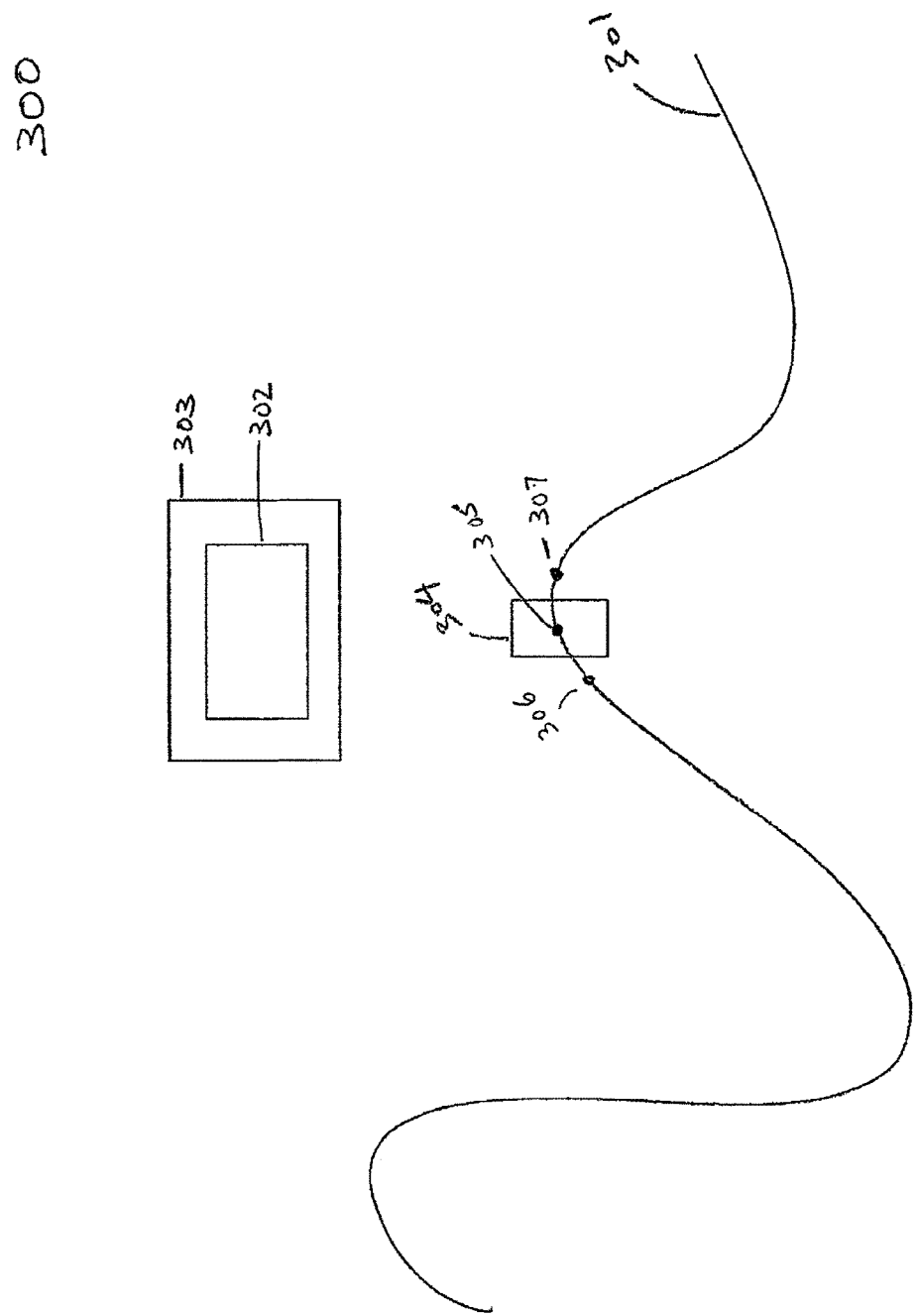
FIG. 3 is a diagram illustrating a relevant discrete point, the preceding discrete point and the subsequent discrete point.

In step 207, the software program deforms the discrete points of the shortlisted flight paths based on the extracted attributes of the images and videos. The software program does this by first selecting discrete points on the shortlisted flight paths for the deformation. FIG. 3 illustrates this. In FIG. 3, there is selected 3D virtual world 300, shortlisted flight path 301, and multimedia content 302 shown on screen 303. The software program would select the most relevant discrete points along the shortlisted flight path 301 for deformation i.e. points on the shortlisted flight path 301 where the screen 303 is in the field of view of the virtual camera 304. This is because these discrete points with have the most impact on the filming by the virtual camera 304 of the multimedia content 302 that will be shown on the screens 303.

In this illustration, discrete point 305 is chosen for deformation. The segment of the flight path (can be in non-linear or linear) between the preceding discrete point 306 and the subsequent discrete point 307 is analyzed for deformation. The software program performs this analysis by first accessing a table of predefined attributes with magnitudes and their corresponding recommended deformations as shown in Table 1 below.

TABLE 1

Table of predefined attributes with magnitudes and their corresponding recommended deformations

| Predefined Attribute | Magnitude | Recommended Deformation |
|---|---|---|
| A | 1.0 | ⌣ |
| A | 0.9 | ⌵ |
| A | 0.8 | ∨ |
| . | . | . |
| B | 1.0 | — |
| B | 0.9 | ⌢ |
| B | 0.8 | ⌢ |
| . | . | . |
| . | . | . |
| Z | . | . |

Table 2 below shows the predefined attributes.

TABLE 2

| Predefined Attributes | |
|---|---|
| Predefined Attribute A | Size of face is 30 × 50 pixels |
| Predefined Attribute B | Size of face is 40 × 60 pixels |
| Predefined Attribute C | Size of text is 12 pixels per inch |
| . | . |
| . | . |
| Predefined Attribute Z | . |

For each predefined attribute, and at a particular magnitude, there is a recommended deformation for the segment of the flight path between the preceding discrete point 306 and the subsequent discrete point 307. Magnitude is a number between 0 and 1, and is a gauge of the extent of how close the extracted attribute of the image or video matches the predefined attribute. The predefined attributes, magnitudes and corresponding recommended deformations are trained data that are stored in a database which the software program can access.

Based on the extracted attributes from multimedia content 302, the magnitude of the predefined attributes for the segment of the flight path between the preceding discrete point 306 and the subsequent discrete point 307 are determined. With the magnitudes, the recommended deformations for each predefined attribute are obtained by referencing Table 1. This is shown in Table 3 below.

TABLE 3

Recommended deformations for each predefined attribute for a segment

| Predefined Attribute | Magnitude | Recommended Deformation |
|---|---|---|
| A | 0.8 | ∨ |
| B | 0.8 | ⌢ |
| C | 0.5 | ∧ |
| D | 0.1 | ⌣ |
| . | . | . |
| Z | . | . |

The recommended deformations are then normalized (averaged) $1/Z\Sigma$recommended deformation to obtain a plurality of normalized deformations for the segment of the flight path between the preceding discrete point 306 and the subsequent discrete point 307. Each normalized deformation for the segment is assigned a local aesthetic score (between 0 and 1). The process is then repeated for each relevant discrete point.

Figure 4:
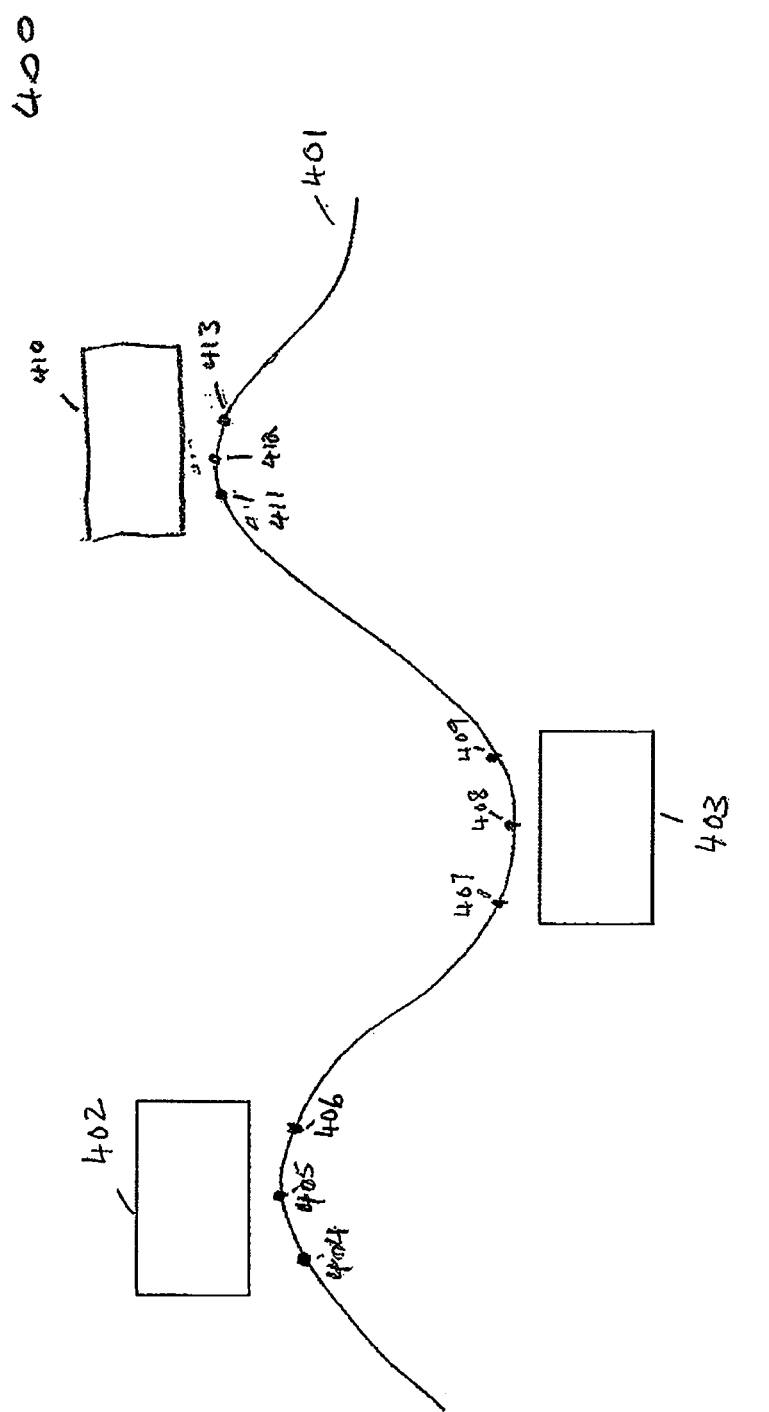
FIG. 4 is a diagram illustrating two relevant discrete points, and their preceding discrete points and subsequent discrete points.

In step 208, the shortlisted flight path is optimized. This optimization is done by selecting a normalized deformation with the best overall score. The overall score for each normalized deformation is calculated by weighting the local aesthetic score of a normalized deformation with a transition score. A transition score (between 0 and 1) is the score given to the suitability of two consecutive normalized deformations. The concept is that the overall deformation of the flight path must be considered as opposed to just considering the local (segment) deformations in isolation. FIG. 4 shows a 3D virtual world 400, a shortlisted flight path 401, and screens 402, 403 and 410. In this case, relevant discrete points 405 and 408 are selected for deformation. Therefore, the segment of the flight path between discrete points 404 and 406 will be analyzed based on the multimedia content displayed on screen 402, the segment between discrete points 407 and 409 will be analyzed based on the multimedia content displayed on screen 403, and the segment of the flight path between discrete points 411 and 413 will be analyzed based on the multimedia content displayed on screen 410.

In step 209, an optimal aesthetic function is used to calculate the aesthetic value of the optimized shortlisted flight paths, and the optimized shortlisted flight path with the highest aesthetic value is chosen as the optimal flight path. The optimal aesthetic function uses a dynamic programming technique (Bellman) where a weighted Direct Acyclic Graph (DAG) is constructed. In the DAG, the vertices are the local deformation hypothesises $\{X_{11}, X_{12}, \ldots X_{1n}, X_{21} \ldots X_{2n}, \ldots X_{k,n}\}$ associated, respectively to the segment to be deformed $\{X_1, X_2, \ldots X_k\}$ and the edges linking two consecutive hypothesises $(X_{in}, X_{jn})$ are weighted by the likelihood of the transition.

In step 210, the virtual camera travels on optimal flight path to record the 2D video.

One skilled in the art can appreciate that one advantage conferred by the described invention is that it provides a relatively simple means of producing unique videos. That is, users with two different sets of multimedia content using the same 3D virtual world will obtain two different videos (for example, an end-user, an advertiser, or an event organizer).

One would also appreciate that an online provisioning of the described invention would allow near immediate production and rendering of a video construction for customers such as MTV or advertisers at a very low cost. A functional production engine takes multimedia content and a 3D virtual world and automatically performs customized rendering of the flight path. In alternative embodiments, the production technology could be provided in an online-only version, where finished productions are offered for sale, a stand-alone version that is sold to end users, or a combination stand-alone version and on-line version that can be expanded through the use of information collection to generate metrics and statistics associated with, for example, tool use, that would provide recommendations and the like and allow for optimized tool offering and other enhancements. Metrics and statistics and other feedback generated from, for example, pre-completed productions with standard path assignments in combination with user feedback could also be used to improve product quality, could be offered in connection with other information, such as demographic information, or the like to generate marketing information, or the like.

Another advantage is that the optimization of the flight path is automatically done according to intelligent, content sensitive, parameters such that meaningful videos can be produced. In an embodiment, the inventive exemplary method and apparatus described herein be used for 3D PowerPoint presentations (companies), 3D consumer electronics ads (Blackberry video), 3D event promotions (MDA, TechVenture 2010), music promotions (Viacom, MTV, Sony, EMI), books promotions (Amazon.com), concerts ticketing (Guns and Roses video) and sports events (World Cup video). Still further, the invention can also be used for daily changes of advertisements and for user-generated advertisements. Globally, implementations in accordance with embodiments can accelerate the productions of high-impact videos for event promotion, online visibility increase and immediate, impactful, viral marketing. For example, in fast paced countries such as Singapore, which is in the process of going all 3D for many advertising, promotional and other content, the methods described herein can enable users to produce their own customized videos, with their own customized 3D paths and customized moods, computed from the analysis of the multimedia content that they upload in the 3D world. Embodiments described herein can also be used in technology for e-Advertisers, web, e-cards, You-Tube, Picassa, PowerPoint, or the like.

Another aspect of the invention is how new flight paths are created to build up the pool of flights paths in the database. One way is to concatenate existing flight paths together to create new flight paths. Another way is to extract sub-paths from existing flight paths and then concatenate the sub-paths to an existing path to create new flight paths (referred to as splicing). The optimized flight paths can also become new flights paths in the database.

There are instances where a 3D virtual world is modified. In such circumstances, the flights paths in the database that are tailored or associated to the modified 3D virtual world must also be modified accordingly. For example, if in the 3D virtual world, a new virtual building is created, the associated flight paths must be altered such that they do not "go through" the new virtual building but "go around" it.

While exemplary embodiments pertaining to the invention have been described and illustrated, it will be understood by those skilled in the technology concerned that many variations or modifications involving particular design, implementation or construction are possible and may be made without deviating from the inventive concepts described herein.

The invention claimed is:

1. A computer-implemented method for recording a video comprising the steps of:
   receiving a selection of at least one visual content from a user;
   providing a 3D virtual world within which a virtual camera can move, and visual content selected by the user can be placed;
   placing at least one visual content selected by the user into the 3D virtual world if the visual content selected is not already in the 3D virtual world;
   providing a virtual camera having at least one parameter;
   automatically, by computer software, using content sensitive parameters which analyze the visual content selected by the user, generating a plurality of possible, previously unspecified 3D virtual flight paths for moving the virtual camera within the 3D virtual world past the visual content selected by the user;
   automatically, by the computer software, using content sensitive parameters which analyze the visual content selected by the user, selecting an optimal 3D virtual flight path from the plurality of 3D virtual flight paths so generated for moving the virtual camera within the 3D virtual world such that the at least one visual content can be optimally viewed by the virtual camera; and
   automatically, by the computer software, recording the video by allowing the virtual camera to travel along the automatically selected optimal 3D virtual flight path.

2. The method of claim 1 further comprising the step of: automatically, by the computer software, using content sensitive parameters to analyze the at least one visual content selected by the user, modifying the at least one parameter of the virtual camera.

3. The method of claim 2 wherein the step of determining the optimal 3D virtual flight path comprises the steps of:
   automatically, by the computer software, using content sensitive parameters, extracting a plurality of attributes from the visual content selected by the user;
   automatically, by the computer software, using content sensitive parameters, optimizing each of the plurality of 3D virtual flight paths based on the plurality of attributes;
   automatically, by the computer software, using content sensitive parameters, using an aesthetic function to calculate an aesthetic quality of each of the optimized plurality of 3D virtual flight paths; and
   automatically, by the computer software, using content sensitive parameters, selecting the optimized 3D virtual flight path with the highest aesthetic quality as the optimal 3D virtual flight path.

4. The method of claim 3 wherein the at least one user selected visual content comprises at least one multimedia content and the step of automatically, by the computer software, using content sensitive parameters, optimizing each of the plurality of 3D virtual flight paths comprises the steps of:
   selecting at least one segment on the 3D virtual flight path;
   optimizing the at least one segment based on the plurality of attributes; and
   deforming the 3D virtual flight path based on the at least one optimized segment.

5. The method of claim 4 wherein the step of automatically, optimizing the at least one segment comprises the steps of:

deriving a plurality of recommended deformations for the at least one segment based on the plurality of attributes;

selecting the recommended deformation using dynamic programming; and deforming the at least one segment based on the selected recommended deformation.

6. The method of claim 3 wherein the at least one user input file containing audio and/or visual content comprises an audio track.

7. The method of claim 1 wherein the step of determining the optimal 3D virtual flight path comprises the steps of:

automatically, by the computer software, using content sensitive parameters, extracting a plurality of attributes from said visual content selected by the user;

automatically, by the computer software, using content sensitive parameters, optimizing each of the plurality of possible 3D virtual flight paths based on the plurality of attributes;

automatically, by the computer software, using content sensitive parameters, using an aesthetic function to calculate an aesthetic quality of each of the optimized plurality of 3D virtual flight paths; and automatically, by the computer software, using content sensitive parameters, selecting the optimized 3D virtual flight path with the highest aesthetic quality as the one, optimal 3D virtual flight path.

8. The method of claim 7 wherein the at least one user selected visual content comprises at least one multimedia content and the step of automatically, by the computer software, using content sensitive parameters, optimizing each of the plurality of 3D virtual flight paths comprises the steps of:

selecting at least one segment on the 3D virtual flight path;

optimizing the at least one segment based on the plurality of attributes; and deforming the 3D virtual flight path based on the at least one optimized segment.

9. The method of claim 8 wherein the step of automatically optimizing the at least one segment comprises the steps of:

deriving a plurality of recommended deformations for the at least one segment based on the plurality of attributes;

selecting the recommended deformation using dynamic programming; and deforming the at least one segment based on the selected recommended deformation.

10. The method of claim 7 wherein the at least one visual content selected by the user is supplemented by an audio track, and at least one parameter of said optimal 3D virtual flight path is automatically, by the computer software, modified based an analysis of the audio track.

11. A non-transitory computer readable medium having stored thereon computer instructions for performing the method of any one of claim 1-10 or 3-6.

* * * * *